United States Patent [19]
Cline et al.

[11] Patent Number: 5,226,113
[45] Date of Patent: Jul. 6, 1993

[54] METHOD AND APPARATUS FOR VOLUMETRIC PROJECTION RENDERING USING REVERSE RAY CASTING

[75] Inventors: Harvey E. Cline, Schenectady; Siegwalt Ludke, Scotia; Charles L. Dumoulin, Ballston Lake, all of N.Y.; Steven P. Souza, Williamstown, Mass.

[73] Assignee: General Electric Company, Schenectady, N.Y.

[21] Appl. No.: 844,983

[22] Filed: Feb. 28, 1992

Related U.S. Application Data

[63] Continuation of Ser. No. 429,111, Oct. 30, 1989, abandoned.

[51] Int. Cl.$^5$ .................................... G06F 15/62
[52] U.S. Cl. ................................ 395/124; 395/119; 395/120
[58] Field of Search .......................... 364/518–521, 364/414, 413.3, 413.22, 413.13–413.16; 324/309, 306; 395/119, 120, 124, 125, 127, 139

[56] References Cited

U.S. PATENT DOCUMENTS

| | | | |
|---|---|---|---|
| 4,283,765 | 8/1981 | Rieser | 395/127 |
| 4,729,098 | 3/1988 | Cline et al. | 364/521 X |
| 4,827,413 | 5/1989 | Baldwin et al. | 364/413.19 |
| 4,984,157 | 1/1991 | Cline et al. | 364/413.13 |

FOREIGN PATENT DOCUMENTS 3903838A 2/1989 Fed. Rep. of Germany .

OTHER PUBLICATIONS

S. M. Goldwasser & R. A. Reynolds, "Real-Time Display And Manipulation of 3-D Medical Objects: The Voxel Processor Architecture, Computer Vision, Graphics & Image Processing", vol. 39, No. 1, 1987.
R. A. Robb and C. Barillot, "Interactive Display and Analysis of 3-D Medical Images", IEEE Transaction on Medical Imaging, vol. 8, No. 3, Sep. 1988.

Primary Examiner—Gary V. Harkcom
Assistant Examiner—Almis Jankus
Attorney, Agent, or Firm—Lawrence P. Zale; Marvin Snyder

[57] ABSTRACT

A method for providing a volumetrically-rendered projection image using reverse ray casting, uses the steps of: acquiring, from an object volume of interest, a set of data sampled from each volume element (voxel) therein responsive to a selected characteristic of that object volume; storing the data for each object voxel in a corresponding data volume element; scanning sequentially through each data voxel within the data volume corresponding to the object volume of interest; projecting each scanned data voxel to an image plane, at a solid angle determined from the solid angle at which the object volume is viewed; storing a value for each image plane pixel, responsive to a selected criteria, from the values of all projected data voxel values impingent upon that image plane pixel; and then scaling the dimensions of each image plane pixel responsive to the dimensions of the corresponding object volume shape, and the involved projection solid angle, to correct for anisotropy.

12 Claims, 3 Drawing Sheets

METHOD AND APPARATUS FOR VOLUMETRIC PROJECTION RENDERING USING REVERSE RAY CASTING

This application is a continuation of application Ser. No. 07/429,111, filed Oct. 30, 1989, now abandoned.

BACKGROUND OF THE INVENTION

The present invention relates to the information display arts and, more particularly, to a novel method and apparatus for volumetric projection rendering from any angle of viewable three-dimensional (3D) data.

In the medical imaging arts, it is well known to construct synthetic X-ray-like images of the interior of a sample volume (e.g. a portion of a patient) by projecting 3D data into a series of views at different angles. A cine loop of rotating projections can be viewed to enhance the perception of depth. In some cases, improved visualization can be accomplished by segmentation of the viewable volume using a model of opaqueness. However, surface rendering, utilizing methods such as those described and claimed in U.S. Pat. Nos. 4,710,876 and 4,719,585, merely creates a shaded image resembling a photograph of the object. A volumetrically-rendered image is often preferable to a surface model, for providing images of a volume-of-interest in which vessel morphology can be viewed with detail from a magnetic resonance (MR) examination, comparable to X-ray techniques. It is desirable to provide a maximum pixel projective display, wherein the maximum intensity of each pixel along the line-of-sight is presented, as such projective display is in a form more natural than the surface display, to the angiographer. Unfortunately, the volumetric display requires more processing and has hitherto been too slow for clinical use in a MR scanner apparatus. It is therefore highly desirable to provide a method, and companion apparatus, for providing a rapidly-processible volumetric medical imaging display.

BRIEF SUMMARY OF THE INVENTION

In accordance with the invention, a method for providing a volumetrically-rendered projection image using reverse ray casting, comprises the steps of: acquiring, from an object volume of interest, a set of data sampled from each volume element (voxel) therein responsive to a selected characteristic of that object volume; storing the data for each object voxel in a corresponding data volume element; scanning sequentially through each data voxel within the data volume corresponding to the object volume of interest; projecting each scanned data voxel to an image plane, at a spherical angle with parameters $\alpha,\beta$ determined from a spherical angle $(\theta,\phi)$ at which the object volume is to be viewed; storing a value for each image plane pixel, responsive to a selected criteria, from the values of all projected data voxel values impingent upon that image plane pixel; and then scaling the dimensions of each image plane pixel responsive to the dimensions of the corresponding object volume shape, and the involved spherical projection angle, to correct for anisotropy. The resulting stored image values can then be displayed if desired.

Apparatus utilizing this method includes: memory means for storing the object volume (3D) data; means for sequentially addressing all object volume elements within the selected volume of interest, to obtain the data stored for the voxel then addressed; means for modifying the spherical angle parameters $(\theta,\phi)$ at which the object is to be viewed to obtain new spherical angle parameters $(\alpha,\beta)$ of a ray which projects the data value in each data voxel onto the projection plane; memory means for storing the data of each projected ray impinging in each picture element (pixel) of the image plane; and means for determining if the projected data value is to be placed in the image memory for that pixel.

Thus, no recalculation or interpolation of the object volume into the intermediate data space, prior to projection to the image plane, is required, so that greater speed and efficiency results.

In a presently preferred embodiment; the method may use either maximum pixel intensity storage, or data intensity averaging.

Accordingly, it is an object of the present invention to provide a novel method and apparatus for reverse ray casting volumetrically-rendered projection images from a three-dimensional data set.

This and other objects of the present invention will become apparent upon reading of the following description of the invention, when considered in conjunction with the associated drawings.

DETAILED DESCRIPTION OF THE INVENTION

Figure 1:
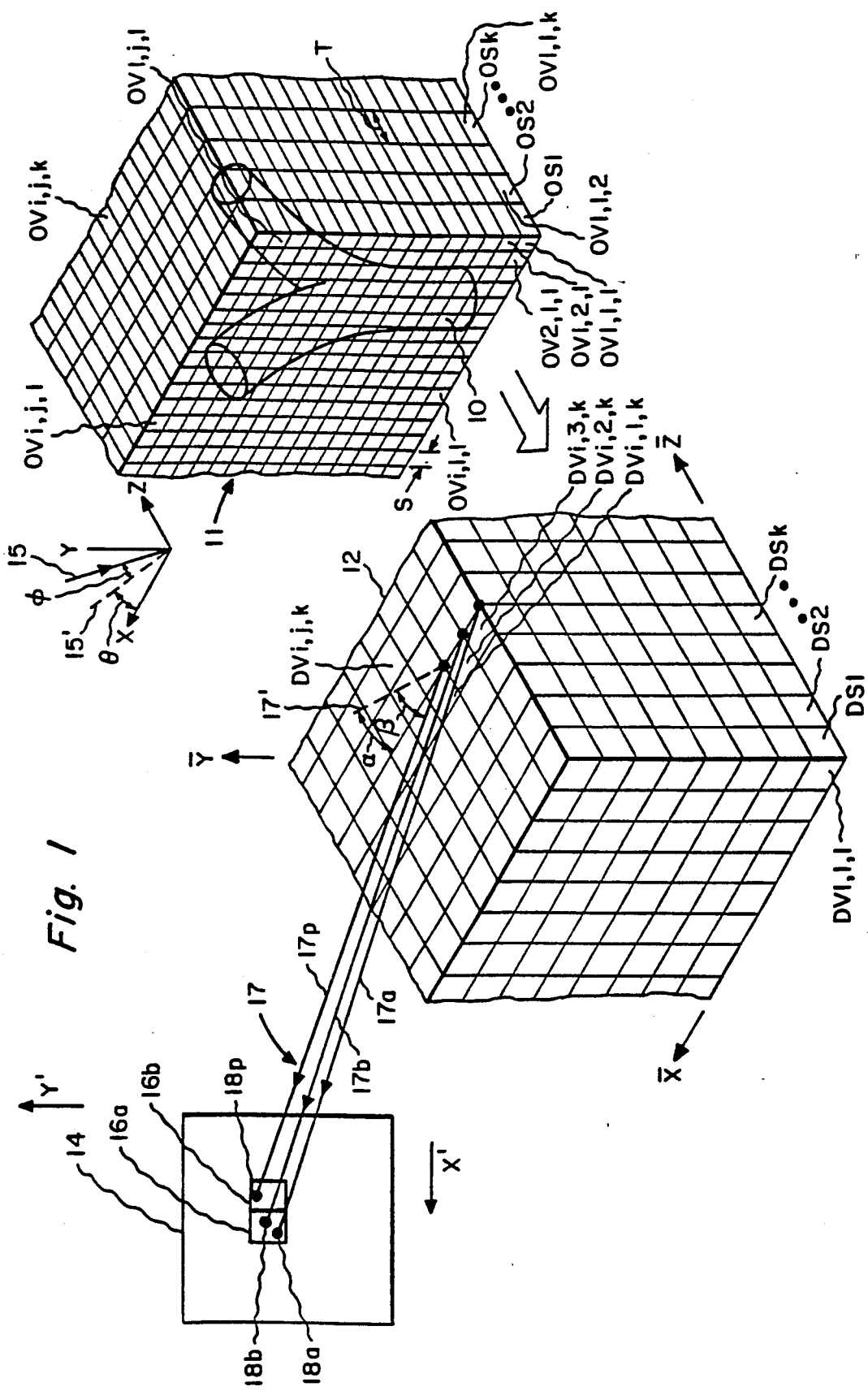
FIG. 1 is a schematic of the sampled object volume-of-interest, an associated data volume and a image projection plane involved in volumetrically-rendering a reversed ray-cast projection in accordance with the principles of the present invention.

In an image display system, such as for displaying volumetrically-rendered projection images of a sample 10 from any arbitrary viewing angle, e.g. a spherical projection angle denoted by angle parameters $(\theta,\phi)$, where $\theta$ is the angle that an extension 15' of a viewing ray 15 makes upon the X-Y plane, and $\phi$ is the angle of ray 15 with respect to extension 15', an object volume 11 is analyzed by at least one desired modality, such as a nuclear magnetic resonance (NMR) scanner and the like. Sample volume 11 is scanned in such a manner as to create a series of stacked, contiguous slices or sheets OS1, OS2, ..., OSk, ... each of which contains the same number of object volume elements (voxels) OV. Each voxel has a rectangular profile in the sheet plane (say, the X-Y plane); while the complementary sides S may be of equal length, so that this profile may be square, the sheet thickness T is generally greater than the length of either side. Thus, the first object slice OS1 contains a first multiplicity of object voxels OVi,j,1, where i and j are the respective x-axis and y-axis positions of the voxel. Similarly, the second object slice OS2 contains object voxels OVi,j,2. An arbitrary object slice OS$_k$ contains voxels OV$_{i,j,k}$, where k is the z-axis position of that voxel.

Each object voxel $OV_{i,j,k}$ is analyzed and the data value thereof is placed in a corresponding data voxel $DV_{i,j,k}$ of a data volume 12. Data volume 12 is a simple cubic i,j,k lattice, even though the thickness of each object slice OSk and each object voxel face size (the size of the voxel in the x-y plane) will not generally be the same. That is, not only may the object volume have different x,y and z dimensions for each voxel, but also the total number of voxels in any dimension need not be the same. For example, a typical MR 3D scan may provide each slice with a 256×256 matrix of voxels, and may involve 128 slices; each slice thickness T may be on the order of 3 mm., while the sides S of each of the voxels in that slice may be 1 mm. and the like. It should be noted that resampling of the 3D data is not necessary, in converting the value of each voxel of the multi-sliced object volume 11 into the data value stored therefore in the corresponding voxel of data volume 12, even though the object voxels will not have correct dimensions when placed in the data space 12.

In accordance with one aspect of the invention, an image of object 10 is projected upon a projection plane 14 by ray casting toward the image plane 14 from a lattice point in data voxel $DV_{i,j,k}$. For convenience, the lattice point may, for example, be the data voxel vertex closest to the data volume origin. The cast ray 17 leaves the data space 12 at a projection angle with spherical angular parameters $(\alpha, \beta)$ transformed from the parameters of the spherical angular parameters $(\theta, \phi)$ at which the object space 11 is viewed. These two angles are not the same, due to the geometric distortion caused by use of a cubic data volume 12 with a non-cubic object volume 11. However, the projected ray 17 does have a $\overline{X}$-$\overline{Y}$ plane extension 17' which makes an angle $\alpha$ with respect to the $\overline{X}$ axis of the data space, and ray 17 makes an angle $\beta$ with the Z axis. Thus, angles $\alpha$ and $\beta$ are determined by a rotation process (to be discussed hereinbelow) to correspond to viewing the object space 11 at the desired viewing angle $\theta, \phi$ (assuming operation in spherical coordinates). Hitherto, a pixel 16 in the image plane 14 has been cast towards the data volume, causing much computational time to be required to determine which of the data volume lattice point/voxel values are to be processed for a ray 17 cast from that pixel 16; complex algorithms were required to determine how close to the cast ray a lattice point/data volume voxel had to be for inclusion for each pixel 16. In the present method, each of the rays 17 is cast in the opposite direction, from the data volume voxel lattice point toward the image plane.

While all rays 17 impinge upon some portion of the image plane, only those rays falling within the image plane pixel 16a under consideration are allowed to contribute to the data for that image plane pixel. Thus, having chosen a portion of the object volume 11 to view and a viewing angle $\theta, \phi$ at which to view this selected object volume, the data value in each voxel of the corresponding portion of the data volume is cast at some angle $\alpha, \beta$ (corresponding to viewing the distorted data space with respect to the object space) toward the image plane. The data value in a first voxel (say, voxel DVi,1,k) is thus back-projected along ray 17a, in accordance with the $\theta$ and $\phi$ values chosen. This ray 17a impinges upon image plane 14 at a position 18a within pixel 16a, and, as this is the first ray to impinge upon this pixel, the intensity value of the incident data is attributed to (stored in) the desired pixel 16a. The next voxel in the data volume (say voxel DVi,2,k) has its associated ray 17b projected at the same angular $(\alpha, \beta)$ configuration from the voxel lattice point, and its position 18b upon image plane 14 is noted. Assuming that impingement position 18b is within desired pixel 16a, the second projected value is (for a maximum pixel projection) compared with the now-stored first value and the larger (more intense) value is placed in storage for pixel 16a. It will be understood that, for an averaged-intensity projection, the value of a current projected data voxel is added to the sum already stored for the image panel pixel upon which that projection ray impinges, and the sum eventually divided by a counted number of such impinging rays, for that pixel. As each voxel in the selected data volume is sequentially entered and projected toward image plane 14, a data volume voxel (say, voxel DVi,3,k) is eventually projected along its associated ray 17p and does not impinge within the desired pixel 16a, so that its intensity data is not compared to the intensity data presently stored for pixel 16a; the maximum intensity data for pixel 16a is now established, for that projection of the data at the particular $\theta, \phi$ three-dimensional angle of view. However, the ray 17p does, in fact, have an impingement point 18p which falls within another image plane pixel (say, pixel 16b) and is compared to the intensity data stored therein and the larger value is, after the comparison, returned to storage for that pixel. It will be understood that all intensity values are reset to zero when a new projection is to be taken. Thus, each of the image plane pixels is reset at the start of an image projection procedure, and all of the data volume voxels (in the entire space or in the selected portion, as set by the portion of the object volume 11 selected) are individually and sequentially scanned; the intensity data value in each data voxel DV is projected through an associated ray 17 to impinge upon image plane 14 in one pixel 16 thereof, with the maximum value in each pixel being compared between the present value of the ray-casted data volume voxel, to determine the larger thereof, which larger value is then stored as part of the maximum intensity image. In practice, for a maximum pixel projection, the stored maximum intensity value will be changed only if the newly-cast data voxel value is greater than the data value already stored for the image plane pixel upon which the newly-cast ray impinges.

Figure 2:
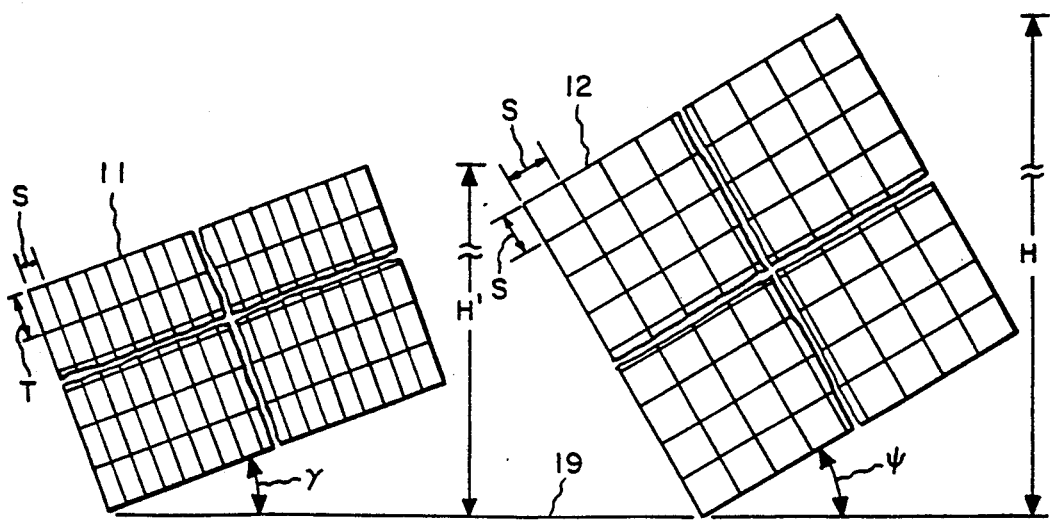
FIG. 2 is a pair of geometric 2D configurations corresponding to like views of object and data spaces, and useful in defining necessary scaling constants.

In accordance with another aspect of the present invention, the data projection is scaled and any anisotropy between the object space and the image plane is removed by only a single set of calculations, after back-projection is complete. Referring now to FIG. 2, it will be seen that, because object space 11 is a real volume while data space 12 is an abstract concept, it is necessary to determine the amount of distortion of the data projection due to the presentation of the cubic data volume lattice 12 at a different angle $\gamma$, in a first plane, then the angle $\psi$ at which an arbitrary viewing direction 19 will be positioned with respect to both the object space 11 and data space 12. It will be seen that the apparent dimensions of each voxel are going to change as the effective elevation angles $\psi$ and $\gamma$ change. It will be seen that, if the aspect ratio A (defined as the ratio of the actual slice thickness T in object volume 11 to the actual pixel size S in the same object volume 11) is not unity (i.e. is greater than unity, as the object voxel is not a cubic voxel, as will be encountered in data space 12), then the angles $\psi$ and $\gamma$ of elevation will not only not be the same, the effective elevation angle $\psi$ in the data space will not be the same as the actual elevation angle γ in the object space. Rotation of the data is in accordance with an object elevation angle obtained by $$\psi = \tan^{-1}((1/A)(\tan[\gamma]))$$

Thereafter, the projected data can be scaled to have the correct height in the object space, by multiplication of all projected data heights by the elevation scale factor. The old projected image height H can be corrected with an effective scale factor $E_a$, where $$E_s = sqrt((A \cos \gamma)^2 + \sin^2 \gamma)$$

and the new height $H' = H \cdot E_s$.

Utilizing the above relationship, the rotation of data space angles $(\alpha, \beta)$ becomes angles $(\theta, \phi)$, because the distortion is only along 1 axis, so that angle $\theta$ equals angle $\alpha$. The elements of the three-by-three rotational matrix [M] can be determined, and given the two involved rotational angles, these relationships can be used to determine the data space-to-image plane transformations:

$$X' = M1X + M2Y + M3Z + XO \text{ and}$$

$$Y' = M4X + M5Y + M6Z + YO,$$

where M1–M6 are the first two rows of the rotational matrix (i.e. M1=-sinθ, M2=cosθ sinψ, M3=O, M4=-cosθ sinψ, M5=-sinθ sinψ and M6=cosψ), X' and Y' are the locations on the image plane of the projected point, and XO and YO are image plane X and Y offsets (respectively referenced to the X and Y lowest value points) at which the selected portion of the image plane begins. After the data is projection onto image plane 14, the image is scaled to correct for the effect of the anisotropic object voxels. It will be seen that factors M1–M6 can be precalculated, at the beginning of a projection (given θ and φ), and these precalculated numbers used for all rotation calculations.

Figure 3:
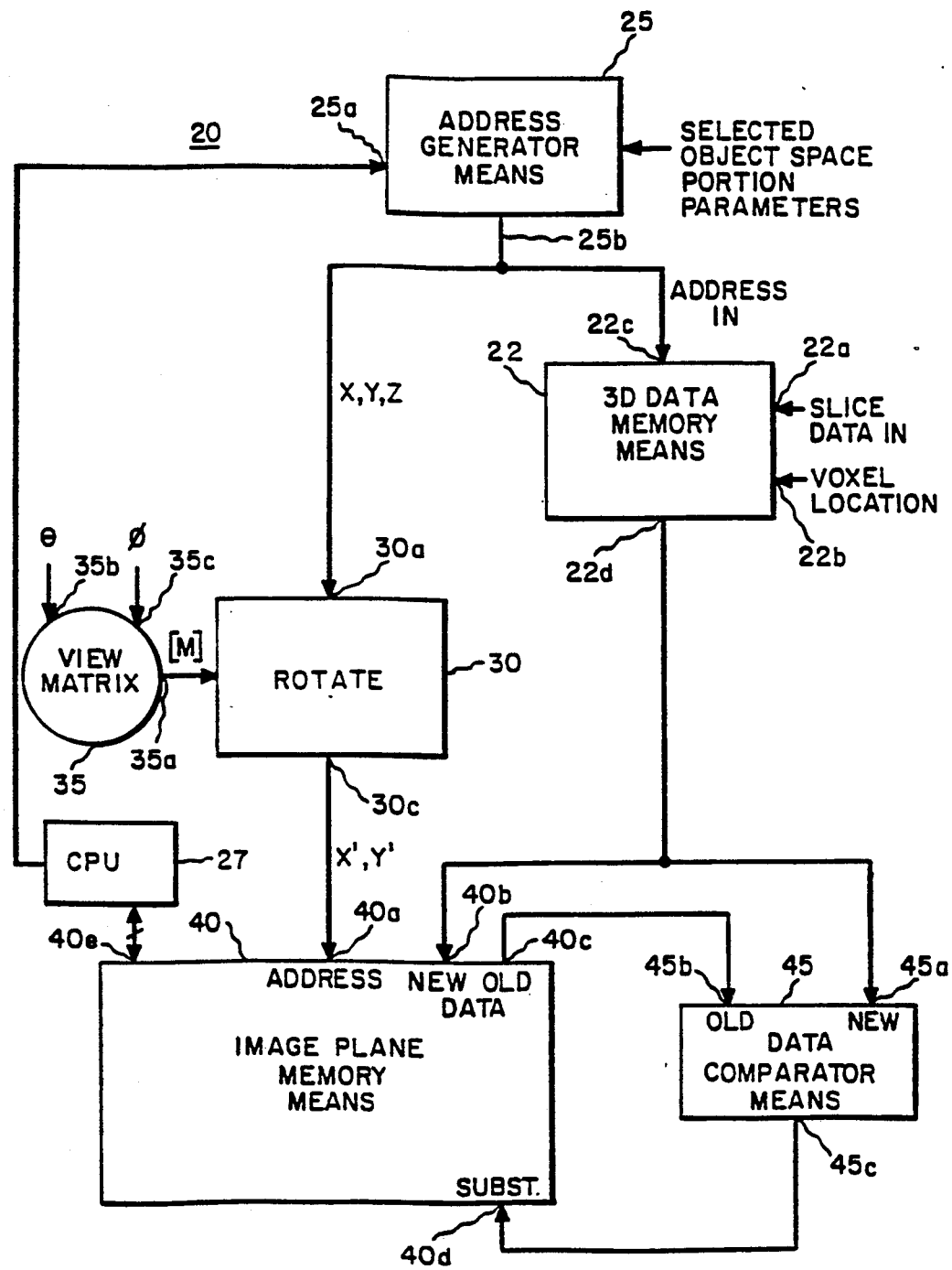
FIG. 3 is a schematic block diagram of means for carrying out the method of the present invention, with respect to providing a maximum intensity projection.

Referring now to FIG. 3, apparatus for use of this method may comprise a subassembly 20 for inclusion in an imaging system. The subassembly includes a 3D data memory means 22 for storing slice data as received at a data input 22a from the modality apparatus sampling the object-to-be-investigated. The data associated with each object voxel is stored at the address of that voxel, responsive to voxel address input information received at a voxel address input 22b from the modality apparatus (e.g. from the modality control data processing unit (CPU) 27, and the like). Once the data memory means is filled (corresponding to the transfer of all required data from object data 11 to data volume 12), the object volume portion of interest is selected and data establishing its starting corner and extent in the X, Y and Z directions is sent from CPU 27 to an input 25a of an address generator means 25. Means 25 sequentially provides, at an address output 25b, the X,Y,Z address of each voxel within the object volume selected. This sequential succession of voxel X,Y,Z addresses at output 25b is provided to an output-data-address input 22c of the data memory means 22, causing the stored intensity data for that one voxel then addressed to be output from data memory means output 22d. The sequence of voxel X,Y,Z addresses is also provided to a first input 30a of a rotational parameter calculation means 30, which receives angle α,β information via the system computer (CPU 27 or the like) as the calculated matrix element M1–M6 values, to provide at an output 30c the address X',Y' of the image plane pixel corresponding to that object X,Y,Z pixel when viewed at a selected viewing angle θ,φ. The viewing angle θ,φ information is entered into the system, is processed by CPU 27 and the results entered into inputs 35b and 35c of a viewing matrix means 35, to provide matrix elements M1–M6 at its output 35a and thence to rotate means 30. The image plane pixel address X',Y' appears at an address input 40a of a frame buffer acting as an image plane memory means 40. Simultaneously, the intensity data, projected from the data space to the projection plane, appears at the image plane memory means new data input 40b, from 3D data memory means output 22d. This data also appears at the new data input 45a of a data comparator means 45. Intensity data previously saved in the image plane memory means 40 for that address, at input 40a, appears at an old data output 40c, and thence at an old data input 45b of the comparator means. The old and new data at inputs 45b/45a, respectively, are compared in means 45 and an output 45c thereof is enabled to a selected logic condition (e.g. a high logic level) if the new data at input 45a is of greater amplitude than the old data at input 45b. Output 45c is connected to a substitute-control input 40d of the image plane memory means, to cause the data stored at the address controlled by input 40a to be changed to accept the new data at input 40b, if the substitute-data control input 40d is at the selected logic level. Thus, the stored data is initially reset, as by a signal through a data/control port 40e (from CPU 27), and the data of greatest intensity is stored for each image plane pixel location X',Y' responsive to a comparison indicating that the new data exceeds the value of the previously-stored old data. After all of the selected addresses are sequentially scanned by address generator 25, the data stored in image plane memory means 40 is scaled in CPU 27, and the scaled image plane data can be withdrawn from memory means 40 for display, permanent storage or the like purposes.

Figure 4:
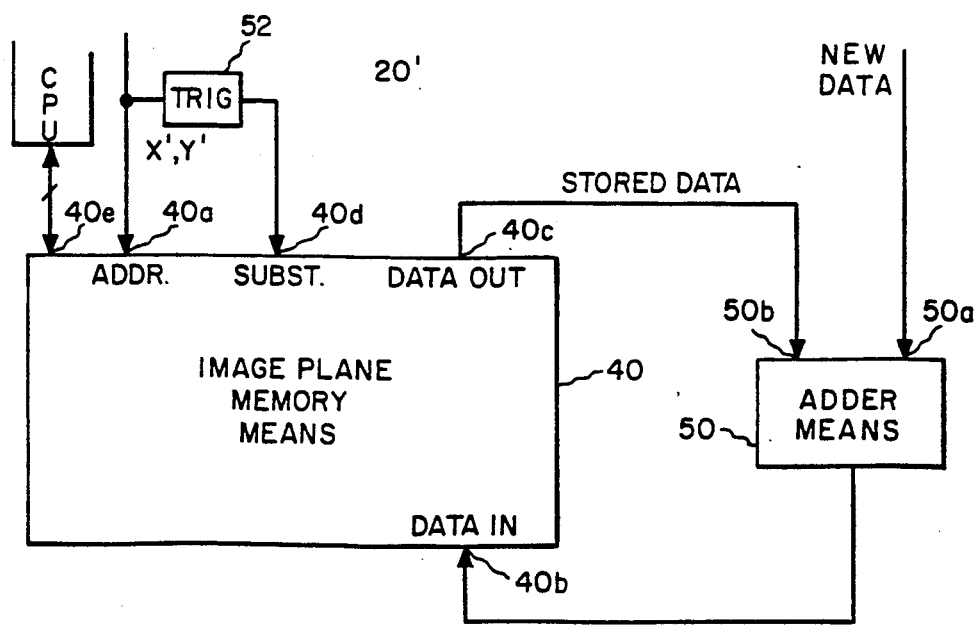
FIG. 4 is a schematic block diagram of a portion of the apparatus of FIG. 3, reconfigured for providing a sum, or average, intensity projection.

In accordance with another aspect of the present invention, maximum pixel projections need not be utilized; FIG. 4 illustrates a modified apparatus 20' portion in which the data comparator means 45 is replaced by a data adder means 50. The average intensity of each image plane pixel is found by the following methodology: for each object volume voxel address X,Y,Z, new data is applied to a first input 50a of adder means 50; simultaneously therewith, the rotated address appears as to corresponding image plane address X',Y' at image plane memory means address 40a. The appearance of new address data is sensed by a trigger means 52, to provide a substitute-data signal at input 40d. This signal occurs with a sufficient delay so that the previously stored data from memory means 40, and available at a data output 40c thereof, has been applied to adder means second input 50b, and the sum of the new and stored data is now available at the data input 40b of the image plane memory means. The summed data is stored in means 40, for that pixel of the image plane, until all of the object volume voxels in the volume of interest have been scanned, and have made their contribution to the associated pixels of the image plane. The image plane pixel sum values are now operated upon by the CPU, via data port 40e of the memory means, in accordance with the number of additions for each image plane pixel (which is a number obtained by adding activations of the input 40d for each pixel and is also stored in image plane memory means 40) to derive the average intensity for each image plane pixel, for display, storage and the like.

While the present invention has been described with one presently preferred embodiment thereof, many modifications and variations will now become apparent to those skilled in the art. It is our intent, therefore, to be limited only by the scope of the appending claims and not by the specific details and instrumentalities presented by way of description of the presently preferred embodiment of the present application.

What we claim is:

1. Apparatus for creating a volumetrically-rendered projection image of a sample object, comprising:

address generator means for providing a sequential series of addresses within a selected object volume of interest;

three-dimensional data memory means for storing data voxel values at each of a multiplicity of addresses, each data voxel value corresponding to a physical characteristic of one voxel of a plurality of slices of the sample object in an object volume, and also for providing a data voxel value upon receipt of an address from said address generator means;

means for rotating a set of input viewing angle parameters and an address of a sample object voxel then being output from said address generator means, to obtain an address of a corresponding pixel location at which a ray cast according to the input viewing angle parameters through the sample object voxel at a point will impinge;

image plane memory mean for storing a projection data value at each of a multiplicity of image plane addresses, each corresponding to one pixel of the image plane;

means for processing the data voxel values from the three-dimensional memory means the processing means employing the data voxel values in updating the image plane memory means at the image plane address corresponding to the viewing angle parameters and the specific data voxel being processed; and scaling the updated values in the image plane memory means; and a display means for displaying the scaled values in the image plane memory means.

2. The apparatus of claim 1, wherein the image plane memory means is reset prior to the providing of a sequence of addresses by the address generator means.

3. The apparatus of claim 2, wherein said processing means includes means for retaining in the image plane memory means the larger of a value of each datum newly-provided form said three-dimensional memory means and (b) a data value already stored in said image plane memory means for a specific pixel, for any voxel projected to impinge upon that image plane pixel.

4. The apparatus of claim 3, wherein said retaining means includes a data comparator, receiving the data value already stored in the image plane memory means and the data value then being output from the three-dimensional memory means, and causing the image plane memory to store the larger of the two input data values.

5. The apparatus of claim 4, wherein the image plane memory means replaces the already stored data only if the data value then being output from the three-dimensional memory means is larger than the stored data value.

6. The apparatus of claim 2, wherein said processing means includes means for summing up, and then storing in the image plane memory means, a value of each datum newly-provided from said three-dimensional memory means and a data value already stored in said image plane memory means for a specific pixel, and also for storing the number of summations carried out for each pixel; the summation data stored for each image plane pixel being divided by the number of summations for that pixel, after all addresses in a sequence have been provided by said address-providing means, to obtain an average data value for that pixel.

7. The apparatus of claim 1, further comprising CPU means for scaling the image plane memory means data representing each object voxel height H by an effective scale factor $E_s$ to obtain a scaled height H' of an associated pixel in the image plane.

8. The apparatus of claim 7, wherein the effective scale factor $E_s = \sqrt{(A\cos\gamma)_2 + \sin^2\gamma}$, $\gamma$ is an angle of elevation in the object slice thickness T to an actual object voxel side S.

9. Apparatus for creating a volumetrically-rendered projection image of a sample object comprising:

data acquisition means for acquiring a three-dimensional data volume comprised of data, each data voxel corresponding to an object volume element of said sample object and each representing a physical characteristic of the corresponding object volume element, and each data voxel having a three-dimensional address corresponding to a location of the corresponding sample object volume;

three-dimensional data memory means connected to the data acquisition means for receiving and storing each data voxel at its three-dimensional address, the three-dimensional memory means also providing a data voxel upon receiving its three-dimensional address;

view matrix means for receiving from a user a pair of viewing angles at which to view an output image and for creating a view matrix;

address generator means connected to the three-dimensional memory means, for providing a three-dimensional address to the three-dimensional memory means and repeating with different three-dimensional addresses until all three-dimensional addresses have been provided only once;

rotate means connected to the address generator means and the view matrix means for receiving the three-dimensional addresses form the address generator means and the view matrix and creating a calculated image plane address representing a point at which each object volume element would be projected onto an image plane from viewing angles;

image plane memory means for storing each image plane pixel at the calculated image plane address, the image plane memory also providing an image plane pixel at the calculated image plane address upon receiving the calculated image plane address;

image processor means connected to the image plane memory means and the three-dimensional memory means for receiving a data voxel from the three-dimensional memory means, and for receiving the image plane pixel from the image plane memory means at the calculated image plane address from the rotate means, and processing the data voxel and the image pixel to produce updated image plane pixel which is stored in the image plane memory means at the calculated image plane address;

central processor unit for scaling each image plane pixel in the image plane memory means to correct for anisotropy introduced by the difference in shape between the object volume element and the corresponding data voxel; and display means for displaying the scaled image plane pixels to produce an X-ray-like projection image.

10. The apparatus for creating a volumetrically-rendered projection image of claim 9 wherein the image processor means is a data comparator means that compares each data voxel with the the image plane pixel at the calculated address and replaces the image plane pixel with the data voxel if the the data voxel is larger than the image plane pixel.

11. The apparatus for creating a volumetrically-rendered projection image of claim 9 wherein the image processor means is an adder means that adds the data voxel with the image plane pixel at the calculated image plane address.

12. The apparatus for creating a volumetrically-rendered projection image of claim 9 wherein the image processor means is an averager means that adds the data voxel to the image plane pixel to create a sum, and counts the data voxels added, divides the sum by the count to create an average and replaces the image plane pixel with the average.

* * * * *